United States Patent
Sherrod et al.

(10) Patent No.: US 6,783,826 B2
(45) Date of Patent: *Aug. 31, 2004

(54) FLUSHABLE COMMODE LINER

(75) Inventors: Earle H. Sherrod, Appleton, WI (US); John E. Kerins, Neenah, WI (US); Richard L. Shick, Aiken, SC (US); Ann L. McCormack, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/027,279

(22) Filed: Dec. 21, 2001

(65) Prior Publication Data

US 2003/0121097 A1 Jul. 3, 2003

(51) Int. Cl.[7] .................. B32B 27/10; B32B 27/12; B32B 27/30; B32B 27/36; A47K 13/00
(52) U.S. Cl. .............. 428/35.7; 428/34.2; 428/57; 428/58; 428/332; 428/480; 428/481; 428/483; 428/507; 428/511; 428/514; 428/522; 4/245.6; 4/245.8; 4/245.9; 4/450; 4/452; 4/DIG. 18
(58) Field of Search .................. 428/480, 483, 428/481, 507, 511, 522, 514, 212, 245.6; 4/245.6, 245.8, DIG. 18, 456, 452

(56) References Cited

U.S. PATENT DOCUMENTS

| 2,169,834 A | 8/1939 | Englert |
| 2,671,906 A | 3/1954 | Potts |
| 3,066,315 A | 12/1962 | Huber |
| 3,115,644 A | 12/1963 | Bloodworth |
| 3,249,950 A | 5/1966 | Wilson |
| 3,263,241 A | 8/1966 | Saulson |
| 3,377,631 A | 4/1968 | Whitney |

(List continued on next page.)

FOREIGN PATENT DOCUMENTS

| BE | 725320 | 5/1969 |
| CA | 774792 | 1/1968 |
| CA | 800204 | 12/1968 |
| CA | 801704 | 12/1968 |
| CA | 819353 | 8/1969 |
| DE | 2 211 880 | 9/1973 |

(List continued on next page.)

OTHER PUBLICATIONS

TAPPI Official Test Method T 494 om–88, "Tensile Breaking Properties Of Paper And Paperboard (Using Constant Rate Of Elongation Apparatus)," published by the TAPPI Press, Atlanta, Georgia, revised 1988, pp. 1–5.

Patent Abstracts of Japan 10–131083A: Description of Nakamura et al., "Hydrolyzable Paper as Dirt Treating Paper."

*Primary Examiner*—Vivian Chen
(74) *Attorney, Agent, or Firm*—Scott A. Baum; Thomas J. Connelly

(57) ABSTRACT

The disclosure describes a commode liner made from a first and a second opposing member defining a top with an opening, a bottom, and a pair of opposing sides. The pair of opposing sides includes a separation distance D, which varies from the top to the bottom, and the distance D is larger at the top than at the bottom. The opposing members can be formed from a latently dispersible barrier composite material including an exposed low strength barrier component, an internal water sensitive layer, and a water permeable, inextensible, water dispersible support layer. When exposed to aqueous conditions on the barrier side, the composite prevents it from passing through to the other layers. When exposed to aqueous conditions on the opposite side, the commode liner readily disperses and may be disposed of by flushing in a toilet, for example. Examples of barrier layers include polylactic acid. Examples of water sensitive layers include polyvinyl alcohol. Examples of support layers include low stretch grades of toilet tissue.

25 Claims, 2 Drawing Sheets

U.S. PATENT DOCUMENTS

| | | | |
|---|---|---|---|
| 3,418,663 A | 12/1968 | Scott | |
| 3,475,767 A | 11/1969 | Friesen et al. | |
| 3,484,874 A | 12/1969 | Bickenheuser, Jr. | |
| 3,546,716 A | 12/1970 | Laumann | |
| 3,591,870 A | 7/1971 | Friesen et al. | |
| 3,605,128 A | 9/1971 | Oden et al. | |
| 3,661,695 A | 5/1972 | Berliner | |
| 3,763,502 A | 10/1973 | Laumann | |
| 3,772,712 A * | 11/1973 | Renn et al. | 4/484 |
| 3,777,317 A | 12/1973 | Hoborn | |
| 3,797,734 A | 3/1974 | Fleury et al. | |
| 3,800,797 A | 4/1974 | Tunc | |
| 3,804,092 A | 4/1974 | Tunc | |
| 3,849,241 A | 11/1974 | Butin et al. | |
| 3,859,125 A | 1/1975 | Miller et al. | |
| 3,897,782 A | 8/1975 | Tunc | |
| 3,906,555 A | 9/1975 | Scott et al. | |
| 3,920,179 A | 11/1975 | Hall | |
| 3,934,587 A | 1/1976 | Gordon | |
| 3,936,890 A | 2/1976 | Oberstein | |
| 3,942,196 A | 3/1976 | Mills | |
| 3,950,578 A | 4/1976 | Laumann | |
| 3,951,893 A | 4/1976 | Gander | |
| 4,005,251 A | 1/1977 | Tunc | |
| 4,011,606 A | 3/1977 | Scrafield et al. | |
| 4,034,079 A | 7/1977 | Schoonman | |
| 4,035,540 A | 7/1977 | Gander | |
| 4,062,451 A | 12/1977 | Gander | |
| 4,136,798 A | 1/1979 | Oberstein | |
| D261,429 S | 10/1981 | Hanna-Burns | |
| 4,314,558 A | 2/1982 | Korpman | |
| 4,343,053 A | 8/1982 | O'Connor | |
| 4,372,311 A | 2/1983 | Potts | |
| 4,375,448 A | 3/1983 | Appel et al. | |
| 4,494,278 A | 1/1985 | Kroyer et al. | |
| 4,509,215 A | 4/1985 | Paz | |
| 4,553,969 A | 11/1985 | Taylor | |
| 4,620,999 A | 11/1986 | Holmes | |
| 4,640,810 A | 2/1987 | Laursen et al. | |
| 4,681,574 A | 7/1987 | Eastman | |
| 4,720,880 A | 1/1988 | Barreau | |
| 4,734,941 A | 4/1988 | DeWitt et al. | |
| 4,759,086 A | 7/1988 | Booth-Cox | |
| 4,762,738 A | 8/1988 | Keyes et al. | |
| 4,826,493 A | 5/1989 | Martini et al. | |
| 4,827,540 A | 5/1989 | Stokes | |
| 4,830,187 A | 5/1989 | Keyes et al. | |
| 4,868,024 A | 9/1989 | Cross et al. | |
| 4,882,794 A | 11/1989 | Stewart, III | |
| 4,908,025 A | 3/1990 | Ketchum, Jr. | |
| 4,930,942 A | 6/1990 | Keyes et al. | |
| 4,946,720 A | 8/1990 | Oishi et al. | |
| 4,990,145 A | 2/1991 | Fleury | |
| 4,996,727 A | 3/1991 | Wyatt | |
| 5,009,647 A | 4/1991 | Cross et al. | |
| 5,009,648 A | 4/1991 | Aronoff et al. | |
| 5,048,589 A | 9/1991 | Cook et al. | |
| 5,108,382 A | 4/1992 | Wright et al. | |
| 5,116,139 A | 5/1992 | Young et al. | |
| 5,135,519 A | 8/1992 | Helmer | |
| 5,158,810 A | 10/1992 | Oishi et al. | |
| 5,190,533 A | 3/1993 | Blackburn | |
| 5,283,090 A | 2/1994 | Umemura | |
| 5,300,358 A | 4/1994 | Evers | |
| 5,312,883 A | 5/1994 | Komatsu et al. | |
| 5,354,132 A | 10/1994 | Young et al. | |
| 5,356,398 A | 10/1994 | Willis | |
| 5,380,309 A | 1/1995 | Keyes et al. | |
| 5,394,571 A | 3/1995 | Vernon | |
| 5,423,782 A | 6/1995 | Wolrich | |
| D363,343 S | 10/1995 | Azimi-Bolourian | |
| 5,455,972 A | 10/1995 | Williams | |
| 5,468,526 A | 11/1995 | Allen et al. | |
| 5,472,518 A | 12/1995 | Patnode et al. | |
| 5,508,101 A | 4/1996 | Patnode et al. | |
| 5,509,913 A | 4/1996 | Yeo | |
| 5,527,171 A | 6/1996 | Soerensen | |
| 5,564,136 A | 10/1996 | Cox | |
| 5,567,510 A | 10/1996 | Patnode et al. | |
| 5,607,551 A | 3/1997 | Farrington, Jr. et al. | |
| 5,611,092 A | 3/1997 | Van Dusen | |
| 5,630,972 A | 5/1997 | Patnode et al. | |
| 5,650,219 A | 7/1997 | Honeycutt | |
| 5,674,578 A | 10/1997 | Giori | |
| 5,681,299 A | 10/1997 | Brown | |
| 5,729,956 A | 3/1998 | McGlothlin | |
| 5,763,065 A | 6/1998 | Patnode et al. | |
| 5,769,831 A | 6/1998 | Freeman et al. | |
| 5,778,458 A | 7/1998 | Speelman | |
| 5,779,860 A | 7/1998 | Hollenberg et al. | |
| 5,798,152 A | 8/1998 | Stevens | |
| 5,871,679 A | 2/1999 | Honeycutt | |
| 5,938,647 A | 8/1999 | Smith | |
| 5,952,433 A | 9/1999 | Wang et al. | |
| 5,960,740 A | 10/1999 | Pelsor | |
| 5,976,694 A | 11/1999 | Tsai et al. | |
| 5,981,012 A | 11/1999 | Pomplun et al. | |
| 6,000,078 A | 12/1999 | Stefano | |
| 6,020,425 A | 2/2000 | Wang et al. | |
| 6,075,118 A | 6/2000 | Wang et al. | |
| 6,075,179 A | 6/2000 | McCormack et al. | |
| 6,100,330 A | 8/2000 | Wang et al. | |
| 6,103,809 A | 8/2000 | Ahmed et al. | |
| 6,111,014 A | 8/2000 | Wang et al. | |
| 6,114,024 A | 9/2000 | Forte | |
| 6,116,780 A | 9/2000 | Young et al. | |
| 6,121,170 A | 9/2000 | Tsai et al. | |
| 6,146,568 A | 11/2000 | Tanner et al. | |
| 6,187,696 B1 | 2/2001 | Lim et al. | |
| 6,199,220 B1 | 3/2001 | Smith | |
| 6,258,427 B1 | 7/2001 | Kerins et al. | |
| 6,270,875 B1 | 8/2001 | Nissing | |
| 6,299,606 B1 | 10/2001 | Young | |
| 6,324,704 B1 | 12/2001 | Imo | |
| 6,345,911 B1 | 2/2002 | Young et al. | |
| 6,514,602 B1 * | 2/2003 | Zhao et al. | 428/212 |
| 6,554,810 B1 | 4/2003 | Wilk et al. | |
| 2003/0116575 A1 | 6/2003 | Ellingson et al. | |
| 2003/0118850 A1 | 6/2003 | McCormack et al. | |

FOREIGN PATENT DOCUMENTS

| | | |
|---|---|---|
| DE | 2 255 323 | 5/1974 |
| DE | 24 57 093 | 6/1975 |
| DE | 35 39 893 A1 | 11/1986 |
| DE | 20016916 U1 * | 12/2000 |
| DE | 20016916 U1 | 1/2001 |
| DE | 200 16 916 U1 | 1/2001 |
| EP | 0 142 950 B1 | 5/1985 |
| EP | 0 272 816 B1 | 6/1988 |
| EP | 0 296 143 A1 | 12/1988 |
| EP | 0 371 622 A1 | 6/1990 |
| EP | 0 388 924 B1 | 9/1990 |
| EP | 0 461 484 A1 | 12/1991 |
| EP | 0 474 173 B1 | 3/1992 |
| EP | 0 518 519 B1 | 12/1992 |
| EP | 0 589 437 B1 | 3/1994 |
| EP | 0 591 450 B1 | 4/1994 |
| EP | 0 703 762 B1 | 4/1996 |
| EP | 0 723 859 B1 | 7/1996 |
| EP | 0 726 068 B1 | 8/1996 |
| EP | 0 773 764 B1 | 5/1997 |

| | | |
|---|---|---|
| EP | 0 773 766 B1 | 5/1997 |
| EP | 0 821 925 A1 | 2/1998 |
| FR | 2 539 985 A1 | 3/1984 |
| FR | 2 653 652 A1 | 5/1991 |
| GB | 898903 | 6/1962 |
| GB | 1 483 917 | 8/1977 |
| GB | 2 193 925 A | 2/1988 |
| GB | 2 204 236 A | 11/1988 |
| GB | 2 211 088 A | 6/1989 |
| GB | 2 349 898 A | 11/2000 |
| JP | 9-154769 | 6/1997 |
| JP | 10-57274 | 3/1998 |
| WO | WO 86/01098 A1 | 2/1986 |
| WO | WO 86/04222 A1 | 7/1986 |
| WO | WO 94/25189 A1 | 11/1994 |
| WO | WO 95/24853 A1 | 9/1995 |
| WO | WO 96/01089 A1 | 1/1996 |
| WO | WO 96/01090 A1 | 1/1996 |
| WO | WO 96/20831 A1 | 7/1996 |
| WO | WO 96/21057 A1 | 7/1996 |
| WO | WO 96/37171 A1 | 11/1996 |
| WO | WO 97/02375 A1 | 1/1997 |
| WO | WO 97/37903 A1 | 10/1997 |
| WO | WO 98/29502 A1 | 7/1998 |
| WO | WO 98/29506 A1 | 7/1998 |
| WO | WO 98/29517 A1 | 7/1998 |
| WO | WO 98/46668 A1 | 10/1998 |
| WO | WO 98/48684 A1 | 11/1998 |
| WO | WO 98/50611 A1 | 11/1998 |
| WO | WO 99/06456 A1 | 2/1999 |
| WO | WO 99/45834 A1 | 9/1999 |
| WO | WO 99/49770 A1 | 10/1999 |
| WO | WO 99/65981 A1 | 12/1999 |
| WO | WO 00/36217 A1 | 6/2000 |

* cited by examiner

FLUSHABLE COMMODE LINER

RELATED APPLICATION

This application is one of two related applications filed on the same day. The other application Ser. No. 10/026,197 is entitled "Latently Dispersible Barrier Composite Material" with inventors Ann L. McCormack and Richard L. Shick, herein incorporated by reference.

BACKGROUND

For commode liners it is desired to contain and/or temporarily prevent passage of aqueous waste or other aqueous materials, and at some later time dispose of the barrier material in a clean and environmentally friendly manner. To be effective, the material of the commode liner should temporarily provide a barrier to leakage, and at the appropriate time desirably break up into components that facilitate suitable disposal, especially by flushing down a toilet, while minimizing adverse effects on the environment.

Prior containers using water sensitive layers of, for example, polyvinyl alcohol (PVOH) exist. Difficulties have been identified with these prior containers because many water sensitive materials like PVOH become dimensionally unstable when exposed to conditions of moderate to high humidity and tend to weaken or stretch. In use, for example, the material can stretch out of shape and/or weaken to the point of rupture. Attempts to add stability by increasing the barrier film thickness, for example, add unacceptable cost and/or increase the issues to be addressed upon disposal. Commode liners made of thicker films have a greater tendency to remain intact on flushing, for example, and clog toilets or downstream systems.

The need continues, therefore, for commode liners providing temporary barrier, latently dispersible properties that are stable under use conditions but also easily disposable under aqueous conditions as by flushing, for example. There is also a need to design the shape of the commode liner to maximize its flushability, especially when disposed of in a modern low water usage toilet. The present invention addresses this and similar needs.

SUMMARY OF THE INVENTION

The present invention includes commode liners of a unique design that are easily flushed by modern low volume toilets. A commode liner using this design is formed from a first and a second opposing member joined together forming a top including an opening, a bottom, and a pair of opposing sides having a separation distance D. The separation distance D varies from the top to the bottom, and the distance D is larger at the top than at the bottom. Thus, the commode liner is tapered and easily flushed by a toilet.

The present invention is also directed at commode liners formed from latently dispersible barrier composites using a low strength barrier layer of water insoluble composition combined with a water sensitive, low strength carrier and on the opposing side of the carrier an inextensible, dispersible support layer. The layers of the commode liner material are bonded and provide a barrier to aqueous liquid contact from one side but the combination disperses when contacted by aqueous liquid from the other side. In use as a commode liner convenient and environmentally sensitive disposal may be achieved. Examples of barrier layers include films or fine fibers of very lightweight construction using polymers such as polylactic acid or polycaprolactone. Examples of water sensitive carrier webs include films of PVOH with or without other components. Examples of inextensible support materials include higher modulus or low stretch toilet tissue grades.

Where all component layers of the commode liner material are biodegradable and/or dispersible, disposal by flushing is facilitated. For many applications it will be desirable to maintain component layers as light or low basis weight as is compatible with the intended use. In particular, the barrier layer may not be readily dispersible if it is of increased thickness. Cost will provide an incentive to reduce the weight of the component layers, particularly for single use applications. Many commode liner applications will use a barrier layer of polylactic acid (PLA) having a thickness in the range of from about 0.5 to about 2.0 microns, PVOH film carrier layer having a thickness in the range of from about 10 to about 50 microns, and a tissue support layer in the range of from about 10 to about 30 gsm, for example. As a result, the composite for the commode liner will desirably have a hydrohead property of at least about 15 mbar, for some applications at least about 25 mbar, for more demanding applications at least about 50 mbar, and in some cases at least about 75 mbar. Bonding of the layers may be by a variety of means that preserve desired properties, including thermal (such as coextrusion or extrusion coating, for example) and adhesive, pattern and smooth bonding means.

Definitions

As used herein unless the context requires a different meaning, the following terms have the meanings set forth below:

As used herein and in the claims, the term "comprising" is inclusive or open-ended and does not exclude additional unrecited elements, compositional components, or method steps.

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers are microfibers that may be continuous or discontinuous, are generally smaller than 10 microns in average diameter, and are generally tacky when deposited onto a collecting surface.

"Bonded carded web" refers to webs made from staple fibers which are sent through a combing or carding unit, which breaks apart and aligns the staple fibers in the machine direction to form a generally machine direction-oriented fibrous nonwoven web. Such fibers are usually purchased in bales that are placed in a picker that separates the fibers prior to the carding unit. Once the web is formed, it then is bonded by one or more of several known bonding methods. One such bonding method is powder bonding, wherein a powdered adhesive is distributed through the web and then activated, usually by heating the web and adhesive with hot air. Another suitable bonding method is pattern bonding, wherein heated calendar rolls or ultrasonic bonding equipment are used to bond the fibers together, usually in a localized bond pattern, though the web can be bonded across its entire surface if so desired. Another suitable and well-known bonding method, particularly when using bicomponent staple fibers, is through-air bonding.

"Airlaying" is a well-known process by which a fibrous nonwoven layer can be formed. In the airlaying process, bundles of small fibers having typical lengths ranging from about 6 to about 19 millimeters (mm) are separated and entrained in an air supply and then deposited onto a forming screen, usually with the assistance of a vacuum supply. The randomly deposited fibers then are bonded to one another using, for example, hot air or a spray adhesive. Examples of airlaying technology can be found in U.S. Pat. Nos. 4,494,278, 5,527,171, 3,375,448 and 4,640,810.

As used herein, through-air bonding or "TAB" means a process of bonding a nonwoven web containing adhesive polymeric component fibers, particles or the like in which air sufficiently hot to melt one of the polymers of which the fibers or particles of the web are made is forced through the web. The air velocity often is between 100 and 500 feet per minute and the dwell time may be as long as 6 seconds. The melting and resolidification of the polymer provides the bonding. Through air bonding has relatively restricted variability and since through-air bonding (TAB) requires the melting of at least one component to accomplish bonding, it is restricted to webs with two components like conjugate fibers or those which include an adhesive. In the through-air bonder, air having a temperature above the melting temperature of one component and below the melting temperature of another component is directed from a surrounding hood, through the web, and into a perforated roller supporting the web. Alternatively, the through-air bonder may be a flat arrangement wherein the air is directed vertically onto the web. The operating conditions of the two configurations are similar, the primary difference being the geometry of the web during bonding. The hot air melts the lower melting polymer component and thereby forms bonds between the filaments to integrate the web.

As used herein, the term "flushable" means a product suitable for disposal in sewer or septic systems that can be flushed down an ordinary water-flushing toilet with two flushes or less nine out of ten times, and that can be successfully transported through the typical municipal sewerage system or septic system piping and pumps without incident (i.e. clogging).

As used herein, the term "water dispersible" refers to structures which when placed in an aqueous environment will, with sufficient time, break apart into smaller pieces. As a result, the structure once dispersed may be more advantageously processable in recycling processes or flushable in, for example, septic and municipal sewage treatment systems. If desired, such structures may be made more water dispersible or the dispersion may be hastened by the use of agitation and/or certain triggering means. The actual amount of time will depend at least in part upon the particular end-use design criteria.

As used herein, the term "commode liner" refers to a liner for the waste receptacle of a toileting device such as a bed pan, toilet training chair, potty chair, portable toilet, commode, toilet, bucket, pail, or other suitable structure for toileting use by an individual. The commode liner is used to contain bodily wastes, and prevent contact of the bodily wastes with interior surfaces of the waste receptacle.

As used herein, the term "biodegradable" means that a material degrades from the action of naturally occurring microorganisms such as bacteria, fungi and algae.

As used herein, the term "tissue" includes not only inextensible, dispersible cellulose based tissue products, but other nonwoven webs having the described properties such as meltblown webs of PVOH fibers, for example. The manufacture of tissue grades of varying extensibility is well known and may be obtained by conventional steps such as creping or wet microcontraction as more fully described, for example, in U.S. Pat. No. 6,270,875, incorporated herein in its entirety by reference. It includes layers that may become saturated and/or allow liquid to pass through, sometimes referred to as "saturation layer".

As used herein, the term "water sensitive" means a structure or layer that loses integrity in contact with water as by means of breaking up or dissolving, for example, but which maintains effective strength for the desired application.

As used herein, the term "water soluble" means dissolves into water as a homogeneous solution.

As used herein, the term "inextensible" means having machine direction stretch of less than 15% measured using the TAPPI Test Method 494 OM-88 "Tensile Breaking Properties of Paper and Paperboard" as the test is described in U.S. Pat. No. 5,607,551, incorporated herein by reference in its entirety. The following parameters may be used: crosshead speed: 10.0 in/min (254 mm/min), full scale load: 10 lb (4,540 g.), jaw span (the distance between the jaws, sometimes referred to as the gauge length): 2.0 inches (50.8 mm), specimen width: 3 inches (76.2 mm). The testing device may be a Sintech, Model CITS-2000 (Systems Integration Technology Inc. Stoughton, Mass.—a division of MTS Systems Corporation, Research Triangle Park, N.C.).

As used herein "joined" includes configurations where one element is directly or indirectly attached to another element by any means including, but not limited to, adhesives, thermal bonding, sonic bonding, chemical bonding, mechanical bonding, pressure bonding, heat and pressure bonding, hydrogen bonding, fasteners, stitching, or other means known to those skilled in the art. Joined also includes elements indirectly joined together. By "indirectly joined" it is meant one element is attached to a second element by one or more intermediate members. For instance, the outer layers in an ordinary plywood laminate are indirectly joined to each other by the laminate's intermediate layers.

Test Procedures

Tensile: As used herein, dry CD tensile strengths represent the peak load per sample width when a sample is pulled to rupture in the cross-machine direction. The sample must be dry and have been conditioned at 73.4±3.6° F., 50±5% relative humidity for at least 4 hours prior to testing. Samples are prepared by cutting a 3-inch wide×6-inch long strip in the cross-machine direction (CD) orientation. The instrument used for measuring tensile strengths is an MTS Systems Synergie 100. The data acquisition software was MTS TestWorks® 3.10 (MTS Systems Corp., Research Triangle Park, N.C.). The load cell is selected from either a 50 Newton or 100 Newton maximum, depending on the strength of the sample being tested, such that the majority of peak load values fall between 10–90% of the load cell's full scale value. The gauge length between jaws is 4±0.04 inches. The jaws are operated using pneumatic-action and are rubber coated. The minimum grip face width is 3 inches and the approximate height of the grip face of the jaw is 1.0 inch. The crosshead speed is 10±0.4 inches/min. The sample is placed in the jaws of the instrument, centered both vertically and horizontally. The test is then started and ends when the specimen breaks. The peak load is recorded as the "CD dry tensile strength" of the specimen. Five (5) representative specimens are tested for each product and the arithmetic average of all five individual specimen tests is the CD tensile strength for the product.

Wet tensile strength measurements are measured in the same manner, but after the center portion of the previously conditioned sample strip has been saturated with distilled water immediately prior to loading the specimen into the tensile test equipment. Sample wetting is performed by first laying a single test strip onto a piece of blotter paper (Fiber Mark, Reliance Basis 120). A pad is then used to wet the sample strip prior to testing. The pad is a green, Scotch-Brite brand (3M) general-purpose commercial scrubbing pad. To prepare the pad for testing, a full-size pad is cut approximately 2.5 inches long by 4 inches wide. A piece of masking tape is wrapped around one of the 4-inch long edges. The taped side then becomes the "top" edge of the wetting pad. To wet a tensile strip, the tester holds the top edge of the pad and dips the bottom edge in approximately 0.25 inches of distilled water located in a wetting pan. After the end of the pad has been saturated with water, the pad is then taken from the wetting pan and the excess water is removed from the pad by lightly tapping the wet edge three times across a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips so the wetted area is approximately centered between the upper and lower grips. The test strip should be centered both horizontally and vertically between the grips. (It should be noted that if any of the wetted portion comes into contact with the grip faces, the specimen must be discarded and the jaws dried off before resuming testing.) The tensile test is then performed and the peak load recorded as the CD wet tensile strength of this specimen. As with the dry CD tensile test, the characterization of a product is determined by the average of five representative sample measurements.

Modulus: A measure of stiffness of a web as determined by Max Slope which is the maximum slope of the machine direction load/elongation curve for the web. The tensile tester program should be set up such that five hundred points such as P1 and P2 are taken over a two and one-half inch (63.5 mm) span of elongation. This provides a sufficient number of points to exceed essentially any practical elongation of the specimen. With a ten inch per minute (254 mm/min) crosshead speed, this translates into a point every 0.030 seconds. The program calculates slopes among these points by setting the 10th point as the initial point (for example P1), counting thirty points to the $40^{th}$ point (for example, P2) and performing a linear regression on those thirty points. It stores the slope from this regression in an array. The program then counts up ten points to the $20^{th}$ point (which becomes P1) and repeats the procedure again (counting thirty points to what would be the $50^{th}$ point (which becomes P2), calculating that slope and also storing it in the array). This process continues for the entire elongation of the sheet. The Max Slope is then chosen as the highest value from this array. The units of Max Slope are kg per three-inch specimen width. (Strain is, of course, dimensionless since the length of elongation is divided by the length of the jaw span. This calculation is taken into account by the testing machine program.)

Hydrohead: A measure of the liquid barrier properties of a fabric is the hydrohead test. The hydrohead test determines the millibars of water pressure that the fabric will support before a predetermined amount of liquid passes through. A fabric with a higher hydrohead reading indicates it has a greater barrier to liquid penetration than a fabric with a lower hydrohead. The hydrohead test is performed according to Federal Test Standard 191A, Method 5514 except that no support was used, and the measure was taken at the first drop of penetration.

Container Flush Test

The container flush test is used to determine if the container is flushable. The test uses a toilet and a lateral plumbing system, which simulates the plumbing components upstream from a sewer main or septic tank in a home. The object of the test is to determine if the container is flushable by the toilet and passes through the plumbing system without clogging.

Materials:

1. Test container such as a commode liner
2. 0.9% Saline (300 ml per test)
3. Toilet Paper (10 standard commercial grade sheets per test)
4. 1.6 gallon standard flush toilet with a minimum ball pass diameter of 2 inches (ANSI AI12.19.2, 1973)
5. Piping system composed of four inch clear plastic piping formed into an approximately 45 foot rectangular array with ¼ inch per foot "fall" and including seven elbows (90°) forming a "lateral piping system". Followed by 31 additional feet with the same "fall" and formed with three elbows (90°) and a U bend. In the lateral piping system the pipes wind around in a rectangular pattern similar to multiple flights in rectangular stair well. The lateral piping system is formed by a short vertical section from the toilet into a 90 degree elbow, then a four-foot run followed by a 90 degree elbow, then a 3-foot run of pipe, another 90 degree elbow, a 10 foot run, a 90-degree elbow, a 3-foot run, a 90 degree elbow, a 10-foot run, a 90 degree elbow, a 3-foot run, a 90 degree elbow, and a final 10-foot run. The remaining piping is used to direct the container to the Simulated Sewer Line apparatus discussed below. Alternative plumbing could be used after the lateral piping system.

Procedure:

1. Pour 300 ml of saline into the commode liner
2. Place 10 sheets of toilet paper into the commode liner
3. Drop filled commode liner into 1.6-gallon toilet
4. Allow approximately 10 seconds for commode liner to sink to bottom of bowl
5. Flush Toilet
6. Observe that commode liner passes through the lateral piping system and does not become clogged.

Pass Criteria:

The container or commode liner is considered flushable if the container flushes in 2 flushes or less, nine out of ten times. The container must also pass through the lateral piping system without clogging. The container need not pass through the lateral piping system in only 2 flushes, but should show continuous movement down the lateral system and eventually reach the outlet.

Container Dispersibility Test

The test is used to simulate flow conditions in a sewer line, such as those typically buried beneath a street servicing a plurality of homes. Such lines are designed to have a sewage flow rate of approximately two feet per second or greater. The object of the test is to determine the degree of container or commode liner break-up prior to reaching the sewerage treatment facility as a result of transport through the sewer lines. It is important for efficient treatment facility operation to have a dispersible container. It is estimated that a container will spend approximately 90 minutes or more in transport to a treatment facility through sewer lines. Ninety minutes is considered the minimum travel time from the home to the treatment facility.

Containers, such as commode liners, were flushed according to the Container Flush Test. The outlet of the Container Flush Test deposited the containers into a Simulated Sewer Line apparatus. The Simulated Sewer Line apparatus is meant to simulate travel through the sewer line to a sewage treatment plant. As such, a flow rate of two feet per second is present in the apparatus, and the containers remain in the tester for ninety minutes. After ninety minutes, the apparatus was drained of water through a screened outlet and the sections of the container caught on the screen recovered. These sections were then measured to determine their total mass. The container is considered dispersed if no more than about 30%, desirably no more than about 25%, and more desirably no more than about 15% of the original barrier layer mass is left.

Materials:

1. Test container such as a commode liner
2. 1.6 gallon flush toilet and lateral piping system as per the Container Flush Test
3. Simulated Sewer Line Apparatus: A circular trough having an outside diameter of about six feet, a trough width of about 6 inches maintained with a water depth of about 6 inches, and a pump to circulate the water at about 2 ft/sec.
4. Ruler Procedure:

1. Record the initial area or mass of the test container
2. Fill Simulated Sewer Line Apparatus with water up to a depth of six inches
3. Begin circulating water in the Simulated Sewer Line Apparatus
4. Ensure the outlet of the lateral piping system will deposit the container into the Simulated Sewer Line Apparatus by use of standard plumbing components
5. Drop the container such as a commode liner into the 1.6-gallon toilet (saline and toilet tissue are included)
6. Flush toilet and observe as commode liner passes through lateral piping system into the additional plumbing and into the Simulated Sewer Line Apparatus
7. Allow the container to circulate for 90 minutes
8. Turn off the water circulation
9. Remove undissolved sections of the container that are visible or floating. Be careful not to damage the sections and keep them separate from one another to avoid sticking.
10. Drain out water thorough a screen to capture any remaining pieces
11. Remove remaining pieces of the container from the Simulated Sewer Line Apparatus
12. Unravel the container pieces (drying is optional)
13. Determine the mass of container portions collected. This can be done either by drying and weighing the pieces, or by calculating the mass based on the area of the collected pieces and the basis weight of the material. Usually, the remaining pieces of the container will be portions of the barrier layer, such as PLA, when the container is formed from the composite illustrated in FIG. 1, but can be other materials. Calculate the percent of the original container mass remaining.
14. Clean up circular transport tester

BRIEF DESCRIPTION OF THE DRAWINGS

The above aspects, and other features, aspects, and advantages of the present invention will become better understood with regard to the following description, appended claims, and accompanying drawings where:

DETAILED DESCRIPTION

Figure 1:
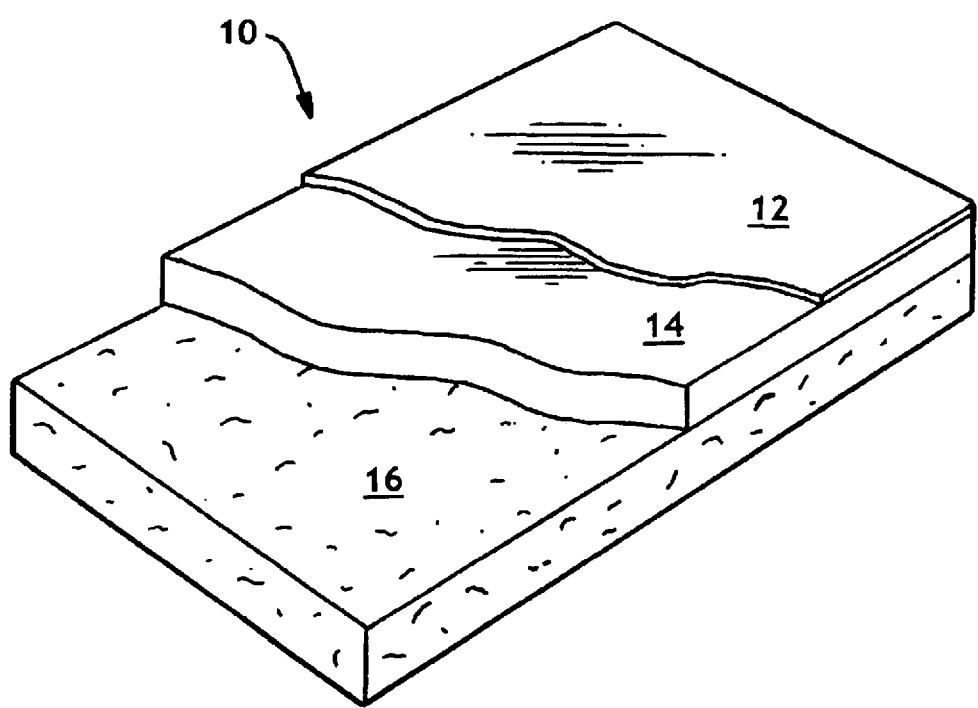
FIG. 1 illustrates one embodiment of a composite useful in making the commode liner.

A desirable implementation of a commode liner utilizes an impermeable substrate, which contains body wastes, but which can be transferred from the commode and flushed down the toilet. In one embodiment of the invention, the commode liner formed from the impermeable substrate provides a barrier to liquid flow in one direction, but is readily dispersible by liquid flow or contact in the opposite direction.

The key features of the impermeable substrate in-use are a minimum level of integrity so the product can be handled in use, for example, the waste bag can be removed from the commode without bursting or stretching to the point of rupture, and a barrier function defined by the hydrohead values of at least about 15 mbar, about 25 mbar, about 50 mbar or about 75 mbar as appropriate to the intended use so the commode liner contains the waste over an extended period of time. The impermeable composite for many applications needs to have sufficient wet flexibility, so the product easily conforms and goes down the toilet, if flushed, and dispersibility, so the film does not clog toilet or pipes and is acceptable for septic or sewer systems.

A commode liner from a material including a coextruded bilayer film coated onto or otherwise bonded to a stabilizing, inextensible, but highly dispersible layer of, for example, tissue, has been developed in accordance with the invention to manage the balance of in-use integrity (strength and barrier) and flushability (wet flexibility and dispersibility). The base layer in the film may be a water-soluble PVOH blend adhered to the tissue layer, with the tissue forming one exposed layer of the liner, while the second, exposed layer may be thin, low strength, fluid-impervious, preferably water insoluble and biodegradable layer, which lines the inside of the product in a commode liner embodiment. The PVOH/tissue layers provide strength prior to disposal, so the product and contents can be carried to the toilet or other aqueous disposal area, although it is possible to design the composite of the commode liner for dry disposal only. In the toilet, the PVOH and tissue dissolve or disperse, leaving only the very thin barrier layer and bodily wastes to move down the toilet. The thin barrier layer must have enough impermeability to contain bodily wastes when supported by the dry PVOH/tissue layers; after clearing the toilet, the thin layer desirably will break up to avoid clogging in the pipes. Desirably, the biodegradable nature of the barrier layer ensures a safe treatment and breakdown of the barrier remnants when they reach the wastewater treatment plant or septic system. It is also desired for certain applications that the barrier layer be maintained thin so as to avoid imparting excessive wet tensile properties to the composite of, for example, more than 2000 g of wet tensile peak load and in some applications, no more than 1000 g.

Examples of barrier film materials in addition to PLA include copolyesters such as Eastar Bio GP products from Eastman, polycaprolactone such as Tone P767 from Union Carbide Corporation, 39 Old Ridgebury Road, Danbury, Conn., a polybutylene succiante polymer or a polybutylene succinate-co-adipate polymer or a mixture of such polymers, polypropylene oxide, cold-water insoluble PVOH, polyvinyl alcohol copolymers, gelatinized starch, nylon copolymers, acrylic acid copolymers, other copolymers of and blends of any of the foregoing. For specific examples, reference is directed to Larson WO 96/20831, incorporated herein in its entirety by reference. Desirable applications will include a barrier layer thickness of up to about 5 microns and, in many cases, up to only about 2 microns.

The water responsive layer of the commode liner of the present invention includes compositions of selectively water-responsive polymer blends. These water-responsive polymer blends may be constructed from water-soluble and hydrolytically degradable polymers including polyethylene oxide (PEO) and polyvinyl alcohol (PVOH). Cold-water soluble PVOH of partially hydrolyzed polyvinyl acetate is desired for the compositions of the present invention and typically the hydrolysis level is between approximately 70% and 85%. The term "hydrolysis level" as used herein, is defined as the percentage of vinyl acetate units in polyvinyl acetate which are hydrolyzed into vinyl alcohol units in the polyvinyl alcohol. Depending upon the purpose and use of the commode liner, compositions comprising different components of variable water sensitivity may be desired. Controlling water-responsiveness is necessary for the commode liner to ensure proper containment of bodily wastes during transport, and to desirably ensure flushability and dispersibility after flushing. The thickness of the water responsive layer will depend on the desired use (flushable or dry disposal) and will frequently be in the range of from about 0.2 mil to about 5.0 mil and, for some applications, in the range of from about 0.5 mil to about 1.5 mil.

Various polymers can be used for the thin barrier layer component which, advantageously, is formed by coextrusion with the water sensitive layer, for example PVOH. As previously mentioned, PLA is ideally suited as a barrier layer, but other polymers may be used, such as polyolefins and the others previously identified. PLA and other biodegradable resins are preferred for environmental reasons.

Generally, manufacturers of polymers utilizing standard processes convert raw material monomers into polymer beads, resins or other pelletized or powdered products, which are commercially available from companies such as Aldrich (Milwaukee, Wis.), Dow Chemical (Midland, Mich.), DuPont Company (Wilmington, Del.), Exxon (Baytown, Tex.), Nippon Goshei (Japan) and Union Carbide Corporation (Danbury, Conn.). The polymer in this form may then be used in processes such as extruding blow-molding, casting films, blowing films, thermoforming, injection molding or fiber spinning at elevated temperatures, for example, to form useful articles. The above processes are collectively referred to as melt processing. Polymers produced by processes that are to be provided commercially as beads, resins powders or other non-finished solid forms are generally referred to collectively as polymer resins.

PLA resins produced by different synthetic methods such as ring-opening polymerization of lactide or direct condensation polymerization from lactic acid are particularly useful for the compositions used for the thin film component in the present invention. PLA (MW=133,900, Viscosity at 1000 (1/s) of 331, melt temperature 169° C., relative viscosity 2-8-3.4 and % D less than or equal to 1.4), purchased from Cargill-Dow as Grade 6200D, may be used, for example. Also exemplary types of resins include various grades from Cargill, Incorporated as are described in WO 98/50611, incorporated herein by reference in its entirety. In addition, thin barrier meltblown layers are contemplated as are also described in WO 98/50611. As stated, the barrier layer, depending on the polymer and use, may have a thickness of about 2 microns or below for economy and ease of disposal. Cold water dispersible PVOH (Gohsenol KP08, KP06, and KP05, purchased from Nippon Gohsei, Japan) are also an exemplary of types of useful resins as are various grades of Evanol 40-05 PVOH from duPont, Wilimington, Del.

The barrier and water-sensitive polymer film compositions used in the commode liner of the present invention are desirably produced by a melt layering process. It is desired for the commode liner of the present invention to coextrude the two components in an extruder, such as a single-screw or twin-screw extruder under appropriate temperature and shear/pressure conditions to ensure bonding. Useful processes are described, for example, in coassigned U.S. Pat. No. 6,075,179 to McCormack and Hetzler issued Jun. 13, 2000 and U.S. Pat. No. 6,114,024 to Forte issued Sep. 5, 2000, each incorporated herein by reference in its entirety. The process can also be performed in a batchwise device, such as a melt mixer or a kneader. PLA or PVOH can be fed into the coextruder either in a single or multimanifold die configuration.

The preferred water sensitive layer is a film of PVOH. The present invention also contemplates as the water sensitive layer layers of selectively water-responsive homogeneous polymer blend compositions comprising a water sensitive polymer blend such as PVOH and anhydride-modified ethylene vinyl acetate available, for example, from du Pont under the trademark BYNEL® for modulus reduction. The term "homogeneous polymer blend composition", as used herein, means that the polymer blend forms a cohesive, continuous structure of anhydride-modified ethylene vinyl acetate and polyvinyl alcohol. A homogeneous polymer blend composition can be achieved by the mixing of polyvinyl alcohol and modified EVA at temperatures above the melting point of the polymer having the highest melting point, and below the decomposition point of the polymer having the lowest decomposition point, in order to form a homogeneous molten mixture of the polymers (prior to cooling to solid form, e.g. films or fibers). For homogeneous polymer blend compositions of modified EVA and polyvinyl alcohol, the polymer having the higher melting point is polyvinyl alcohol and the polymer having the lower decomposition point is also polyvinyl alcohol. The melting point for polyvinyl alcohol is generally approximately between 180–190° C., and more specifically around 183° C. The decomposition point of polyvinyl alcohol is above approximately 200° C. The resulting composition resembles islands of modified EVA in a sea of polyvinyl alcohol, for example, and at a microscopic level has the appearance of approximately uniform distribution of modified EVA in polyvinyl alcohol. The homogeneous polymer blend composition useful in the commode liner of the present invention therefore has very fine dispersion of modified EVA within polyvinyl alcohol. The homogeneous polymer blend composition, therefore, is formed prior to the polymers being formed into films or nonwovens, resulting in compositions of polymers which are highly, and intimately interconnected, having a selectively uniform dispersion. Such compositions are distinguishable from those comprising blended polymers that consist of polymers which are blended after they have been formed into fibers or films, resulting in compositions which do not have approximate uniform dispersion and often appearing as individual polymers layered or mixed together. Summarily, when individual polymers are mixed at temperatures above the melting point of the polymer having the highest melting point, and below the decomposition point of the polymer having the lowest decomposition point, an approximately uniform distribution and dispersion of polymers results. In contrast, when individual polymers are mixed according to standard practices, a blended polymer composition results wherein the polymers are not as integrally associated. The water-sensitivity of the polymer compositions may be controlled according to the degree of the homogeneity of the polymer blends.

Turning to FIG. 1, a composite useful for the commode liner of the invention is illustrated in perspective and partial cross-section, although not to scale because of the extremely thin barrier film layer. As shown, composite 10 comprises barrier film layer 12, water dispersible film layer 14, and inextensible support layer 16.

Figure 2:
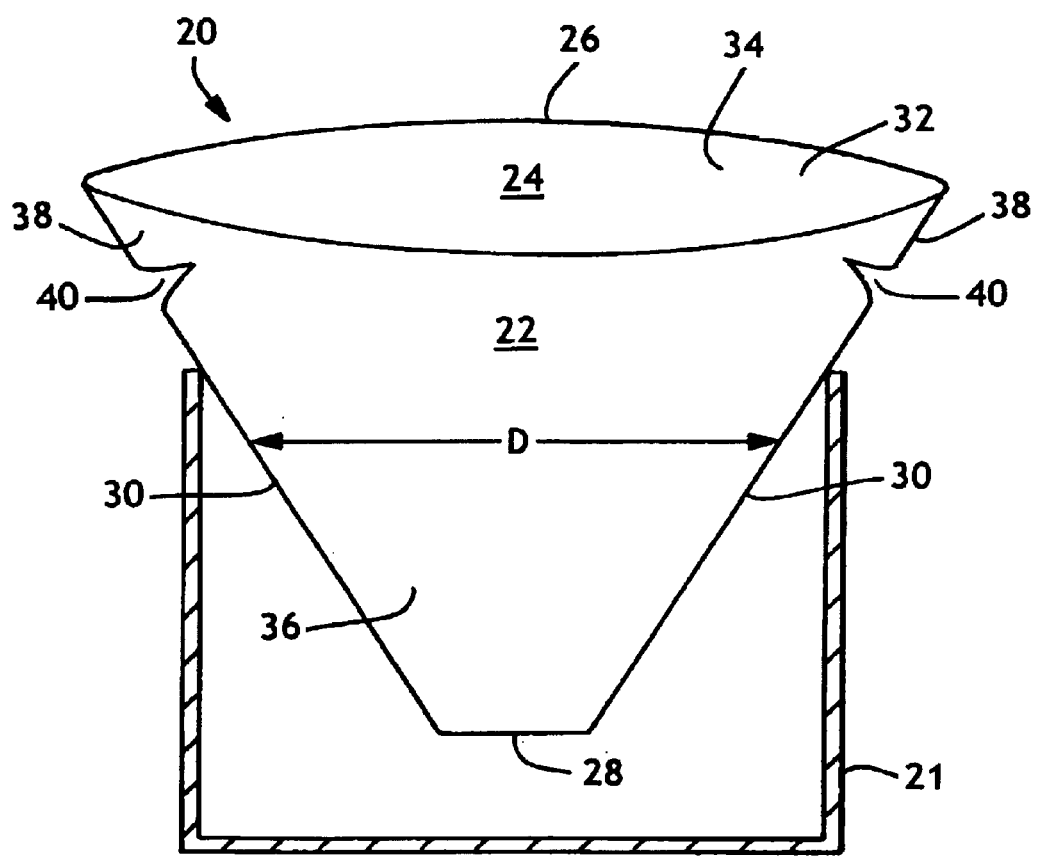
FIG. 2 is a perspective view illustrating one embodiment of the commode liner disposed within a pail.

Referring now to FIG. 2, a commode liner 20 forming a container for bodily wastes is constructed from the composite illustrated in FIG. 1. The commode liner can be constructed of other suitable materials in addition to the composite illustrated in FIG. 1. Preferably, such materials are water dispersible so the commode liner can be disposed of by flushing in a toilet. The commode liner 20 is shown disposed within a pail 21, depicted as a cross-section, which serves as a waste receptacle in a typical commode.

The commode liner 20 includes a first and a second opposing member 22 and 24 respectively, a top 28, a bottom 28, and a pair of opposing sides 30. An opening 32 into the commode liner 20 is located in the top 26. The opposing members 22 and 24 are cut from the composite of FIG. 1, and joined along the bottom 28, and the pair of opposing sides 30 to form the commode liner 20. The opposing members 22 and 24 are joined together such that the barrier layer forms an interior surface 34, and the support layer forms an exterior surface 36. The commode liner 20 can also include a handle 38 formed by cutting a slit 40 into one or both of the pair of opposing sides 30.

A distance D, which varies from the top of the commode liner to the bottom, separates the opposing sides 30. In one embodiment of the invention, the commode liner was formed without handles by joining trapezoidal opposing members 22 and 24 together, which were cut from the thin, relatively flat composite sheet material of FIG. 1. The trapezoidal members had a distance D of 24 inches at the top and a distance D of 3.5 inches at the bottom. The distances where measured by placing a ruler along the top and bottom of the commode liner. Although not dimensioned, the height of the trapezoidal opposing members was 13 inches resulting in an area of 312 in$^2$ for each trapezoidal opposing member. The resulting commode liner had a capacity of approximately 6 liters when opened as illustrated in FIG. 2. Preferably, the commode liner has capacity greater than about 750 milliliters, more preferably greater than about 900 milliliters, and most preferred greater than about 1,200 milliliters.

In addition to increasing the strength of the commode liner, the support layer has been found effective to increase the flushability of the liner. Wetted POVH is relatively tacky and can often stick to other surfaces, including the porcelain surface frequently present in the bowl of an ordinary toilet. Thus, if a two-layer laminate of PLA and PVOH is used to form the commode liner, the commode liner can stick to the toilet bowl's porcelain surface especially if the liner is not fully submerged when discarded. This occurs because partially saturated portions of the PVOH layer above the water line swell, but are not exposed to a sufficient quantity of water to dissolve. The partially saturated portions of PVOH are tacky and will stick to other surfaces readily. The stuck portions of the PVOH layer can prevent or reduce the flushability of the commode liner. Thus, improved flushability for the commode liner can be achieved by adding an additional layer to the composite, such as a support layer of tissue, to prevent the water sensitive layer from sticking to the toilet during flushing.

Improved flushability of the commode liner also results for another reason when tissue is used as the support layer. In order for the commode liner to readily flush, the liner must be flexible enough to pass through a toilet bowl's discharge outlet, which is about four inches or less in diameter. When tissue is used as the support layer, the wet flexibility of the commode liner is significantly increased compared to the dry flexibility of the liner. For example, when the used commode liner is placed into the toilet typically only a portion of the commode liner is submerged in the water. Water in the toilet bowl begins to saturate portions of the tissue support layer above the water line by wicking. The wicking progression can be observed as an advancing wet line on the outer surface 36, or by darker appearing areas on the outer surface, especially of portions of the commode liner above the water line. This visual wicking or saturation cue provides assurance the commode liner is suitable for flushing because it absorbs water and behaves similar to tissue paper in the eyes of an ordinary consumer. After saturation, the wet flexibility of the commode liner is greatly increased from its dry flexibility, and the commode liner possesses adequate flexibility to pass through the discharge outlet and other bends or turns in the trapway of a toilet or in a plumbing system. Therefore, it is not necessary to wait for the composite to disperse or dissolve prior to flushing the commode liner.

Finally, improved flushability for the commode liner results from the tapered commode liner illustrated in FIG. 2. As shown, the bottom 28 is of a smaller dimension than the top 26, and the separation distance D between the pair of opposing sides 30 varies by tapering from the top 26 to the bottom 28. One way of constructing a tapered commode liner, is to cut the pair of opposing members 22 and 24 into a trapezoidal shape. However, it is possible to cut the opposing members 22 and 24 into other shapes, which have the top 26 larger than the bottom 28 and the opposing sides 30 can be curvilinear, stepped, or linear in such a construction.

Use of a tapered commode liner promotes entry of the commode liner into the toilet bowl's discharge outlet improving flushability. It has been determined that in order to readily flush the commode liner down an ordinary water-flushing toilet, the liner's shape is an important criteria. The commode liner depicted in FIG. 1 possesses superior flushability because the bottom 28 can pass readily into the toilet bowl's discharge outlet. With the bottom 28 initially started into the toilet bowl's discharge outlet, the remainder of the commode liner, assisted by its wet flexibility, will readily collapse and be pulled along by the toilet's flushing action. The liner will flush successfully without clogging the toilet.

Typical flush toilets have a discharge outlet diameter from the bowl of about four inches or less. Thus, a commode liner designed with a bottom 28 less than about four inches will fit inside the typical discharge outlet of a toilet. Such a commode liner is readily flushed. However, it has been found that it is not necessary for the bottom 28 to be of a dimension smaller than the discharge outlet. Containers that have a distance D on at bottom that is less than the distance D at the top have improved flushability as well. Preferably, the distance D at the bottom is less than about eight inches, more preferred the distance D is less than about six inches, and most preferred the distance D is less than about four inches.

Preferably, the commode liner of the present invention is formed from the composite illustrated in FIG. 1. One embodiment of a water sensitive layer useful in commode liners of the present invention is a homogeneous polymer blend composition comprising approximately 1–35% modified EVA and approximately 65–99% polyvinyl alcohol, wherein such composition is water-dispersible.

The compositions described may be formed into polymer films. Alternatively, nonwoven webs such as spunbonded webs, airlaid webs, bonded carded webs, and meltblown webs may be formed satisfying the above criteria for barrier, water sensitive and inextensible components. In particular, barrier layers of fine meltblown PLA fibers and water sensitive layers of meltblown PVOH fibers are contemplated for use in accordance with the invention.

Requirements for the inextensible, water dispersible layer are that it provide sufficient strength and stability for the intended use and that it disperse or dissolve in contact with aqueous liquid or otherwise allow water to permeate to the water sensitive layer. For applications such as commode liners, for example, it is important that the layer be relatively inextensible because stretching or sagging leads to fracture of the barrier layer and may result in leakage of the contents. In this regard, extensibility of the layer is desirably less than about 15% as measured by tensile testing and even more desirably less than about 12% or, for some applications, less than about 10%. This layer also desirably will have a modulus in the range of greater than about 10 as measured by max slope as described above and for some applications in the range of greater than 15 or for others greater than 20. Suitable layers are formed from low crepe (flat) bathroom tissue with no wet strength additive and having a basis weight in the range of from about 10 to about 30 gsm, for example. Traditional soft, creped tissue having extensibility outside these ranges has not provided the necessary stability. The combination with the barrier layer and water sensitive layer is desirably produced by coextrusion of a bilayer film onto the tissue but the layers may be interbonded by adhesive, thermal or other means consistent with obtaining the properties described. For many applications it is desirable for the barrier layer to be as thin as is practical consistent with manufacturing and functionality. For example a PLA film of thickness in the range of from about 0.5 micron to about 2 microns may be coextruded with a PVOH film having a thickness in the range of from about 10 microns to about 50 microns. For cost savings the total thickness is desirably within the range of from about 10 to about 30 microns for many applications. As will be appreciated, thicknesses may vary outside those ranges for certain applications. Desirably, the coextruded film is applied directly to the inextensible, water dispersible layer with the water-sensitive, for example, PVOH side in contact with the inextensible layer.

EXAMPLES

Example 1

A composite useful in forming commode liners of the invention was produced using the following procedure: a 1.5 micron barrier layer of PLA (6200 PLA from Cargill-Dow) and an 18.8 micron water-sensitive PVOH (Evanol 40-05 from DuPont) layer were coextruded as a two layer cast film of 20.3 microns thickness using a single screw extruder and melt temperature ranging from about 280 to 380° F. for the PVOH containing layer and about 300 to 385° F. for the PLA layer. This two layer film was directly coextruded with the PVOH layer contacting a 13 gsm low extensible (12.5% MD extensibility, MD Max Slope of 20.8) tissue layer containing no wet strength additive, water dispersible tissue (City Forest Grade 4089) at a rate of about 274 fpm (1.39 m/sec).

Example 2

Example 1 was repeated except that the PLA barrier layer thickness was decreased to 1.3 microns and the water sensitive layer was an 80%/20% blend of PVA and modified EVA (Bynel 3860 from DuPont) having a thickness of 24.1 microns.

Comparative Example 1

Example 1 was repeated except that the coextruded film was reversed and the PLA layer contacted the tissue layer.

Comparative Example 2

Example 1 was repeated except that the thickness of the PLA layer in the coextruded film was 1.9 microns and the water sensitive layer was a blend of 80% PVOH (NK05 from Nippon) and 20% anhydride modified EVA (Bynel 3860 from DuPont). In addition, the tissue layer was 13 gsm high extensible (21% MD extensibility, MD Max Slope of 3.4) water dispersible tissue (available as Member's Mark brand toilet tissue from Sam's Club outlets).

Comparative Example 3

Example 1 was repeated except that the coextruded film was made up of a layer of PLA of 2.0 microns thickness and PVOH layer of 18.3 microns thickness.

Results

Tensile, hydrohead and dispersibility testing of the above examples were carried out with the following results:

| Film/Tissue Laminate: | MD Tensile Peak Load mean (g) | CD Tensile Peak Load mean (g) | CD Wet Tensile Peak Load mean (g) | Hydro-head (mbar) | Dispersibilty Mass* Remaining % | Dispersibility Recoverable Barrier Layer** Fragments % |
|---|---|---|---|---|---|---|
| Example 1 | 5627 | 3684 | 836 | 22.5 | 0.5 | 11 |
| Example 2 | 5936 | 4163 | 822 | 33.7 | 0.8 | 25 |
| Comparative 1 | 5955 | 5170 | 3933 | 12.0 | 4.3 | 93 |

-continued

| Film/Tissue Laminate: | MD Tensile Peak Load mean (g) | CD Tensile Peak Load mean (g) | CD Wet Tensile Peak Load mean (g) | Hydro-head (mbar) | Dispersibilty Mass* Remaining % | Dispersibility Recoverable Barrier Layer** Fragments % |
|---|---|---|---|---|---|---|
| Comparative 2 | 10,000 | 6878 | 612 | 9.9 | 0.7 | 14 |
| Comparative 3 | 7378 | 6633 | 508 | 92.5 | 2.0 | 32 |

*based on entire laminate mass
**based on original barrier layer mass

Tensile results based on an average of five tests except for Example 1 hydrohead (1 test). Comparative 1 barrier and water sensitive layers remained substantially intact.

As shown, the commode liner of the present invention provides a unique combination of strength, hydrohead and dispersibility properties. Comparative Example 1 with the barrier layer melt extruded directly onto the tissue resulted in reinforcing the tissue and prevented it from being dispersed. Comparative Example 2 using an extensible support tissue characteristic of "soft" tissue allowed the fragile barrier layer to crack and fail thus imparting insufficient hydrohead properties. Comparative Example 3 with a thick barrier layer failed to disperse well.

It will be appreciated that the foregoing description, given for purposes of illustration, is not to be construed as limiting the scope of this invention, which is defined by the following claims and all equivalents thereto.

What is claimed is:

1. A commode liner comprising:
    a first and a second opposing member each having a hydrohead of at least about 15 mbar;
    the first and second opposing members joined together forming an interior surface, an exterior surface, a top having an opening, a bottom, and a pair of opposing sides; and
    wherein the top is larger than the bottom, wherein the commode liner is flushable as tested by the Container Flush Test.

2. The commode liner of claim 1 wherein the first and second opposing members are trapezoidal in shape.

3. The commode liner of claim 2 wherein the first and second opposing members each have a hydrohead value of at least about 25 mbar.

4. The commode liner of claim 2 wherein the first and second opposing members each have a hydrohead value of at least about 50 mbar.

5. The commode liner of claim 2 wherein the first and second opposing members each have a hydrohead value of at least about 75 mbar.

6. The commode liner of claim 1 wherein the commode liner is dispersible as tested by the Container Dispersibility Test.

7. A commode liner comprising:
    a first and a second opposing member each having a hydrohead of at least about 15 mbar;
    the first and second opposing members joined together forming an interior surface, an exterior surface, a top having an opening, a bottom, and a pair of opposing sides;
    the opposing sides separated by a distance D varying from the top to the bottom, and
    wherein the distance D is larger at the top than at the bottom, wherein the commode liner is flushable as tested by the Container Flush Test.

8. The commode liner of claim 7 wherein the first and second opposing members are trapezoidal in shape.

9. The commode liner of claim 7 wherein the commode liner when wet is more flexible than the commode liner when dry.

10. The commode liner of claim 7 having a capacity for bodily wastes, and the capacity of the commode liner is greater than about 750 milliliters.

11. The commode liner of claim 7 wherein the distance D is less than about 8 inches at the bottom of the container.

12. The commode liner of claim 7 wherein the interior surface comprises polylactic acid.

13. The commode liner of claim 7 wherein the exterior surface comprises tissue.

14. The commode liner of claim 13 wherein the distance D is less than about 4 inches at the bottom of the container.

15. The commode liner of claim 7 wherein the exterior surface wicks water when the commode liner is partially submerged in water, and the wicking provides a visual cue the commode liner is flushable.

16. A commode liner comprising:
    a first and a second opposing member joined together forming a top including an opening, a bottom, and a pair of opposing sides, wherein the top is larger than the bottom;
    an interior surface characterized by a barrier layer of water insoluble composition;
    an exterior surface characterized by a water permeable, inextensible, dispersible support layer; and
    a water sensitive layer located between the barrier layer and the support layer, wherein said three layers are interbonded forming a composite, and the composite acts as a barrier to aqueous contact on the interior surface and disperses on aqueous contact to the exterior surface.

17. The commode liner of claim 16 wherein the exterior support layer isolates the water sensitive layer from contact with toilet surfaces during flushing preventing partially saturated portions of the water sensitive layer from sticking to the toilet.

18. The commode liner of claim 16 wherein the barrier layer comprises a film having a thickness less than two microns.

19. The commode liner of claim 18 wherein the barrier layer comprises polylactic acid.

20. The commode liner of claim 16 wherein the water sensitive layer comprises polyvinyl alcohol.

21. The commode liner of claim 16 wherein the support layer comprises a tissue layer.

22. The commode liner of claim 16 wherein the composite has a hydrohead of at least 15 mbar.

23. The commode liner of claim 22 wherein the composite has a CD wet tensile maximum load of about 1000 g.

24. A commode liner comprising:

a first and a second opposing member each having a hydrohead of at least about 15 mbar;

the first and second opposing members joined together forming an interior surface, an exterior surface, a top having an opening, a bottom, and a pair of opposing sides separated by a distance D varying from the top to the bottom; and wherein the distance D is less than about 6 inches at the bottom, the commode liner is flushable as tested by the Container Flush Test, and the commode liner is dispersible as tested by the Container Dispersibility Test.

25. The commode liner of claim 24 wherein the distance D is less than about 4 inches at the bottom.

* * * * *